Feb. 27, 1951 L. J. GARAY V. 2,543,492
CHECKING DEVICE
Filed Jan. 10, 1947 3 Sheets-Sheet 1

Inventor
Luis J. Garay V
By Carlson, Pitzner, Hubbard & Wolfe
Attys.

Feb. 27, 1951 L. J. GARAY V. 2,543,492
CHECKING DEVICE
Filed Jan. 10, 1947 3 Sheets-Sheet 2
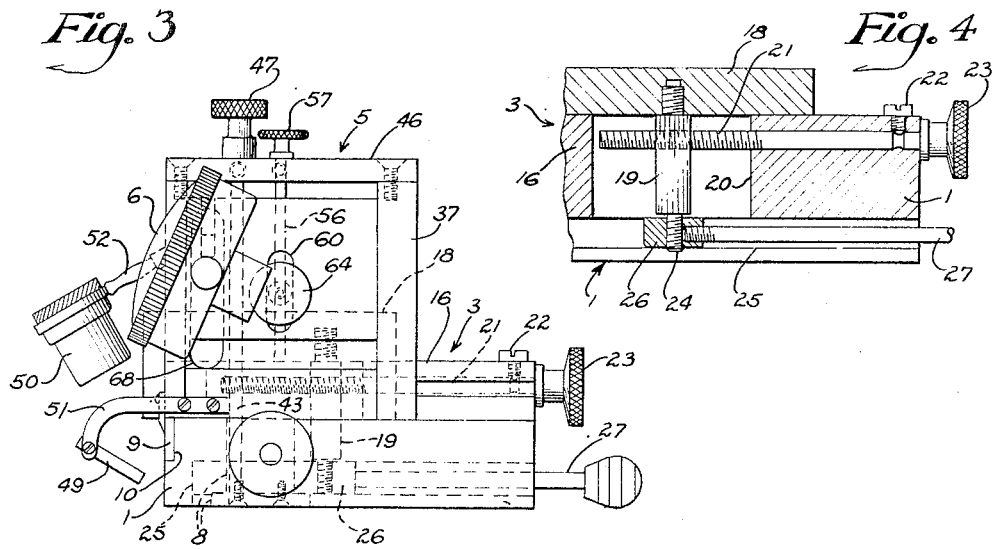
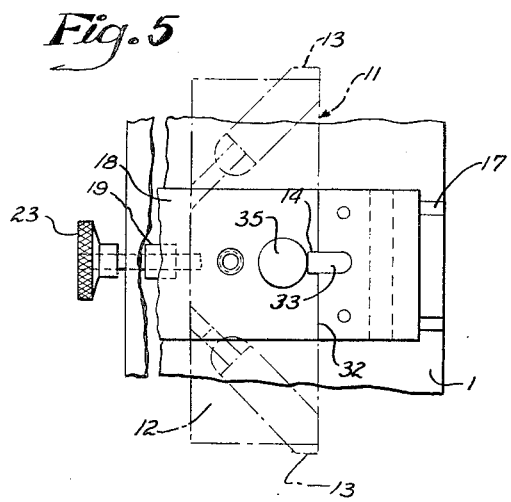
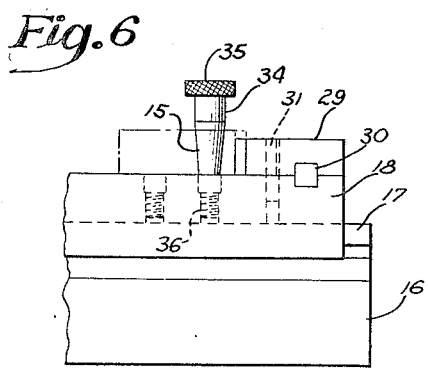
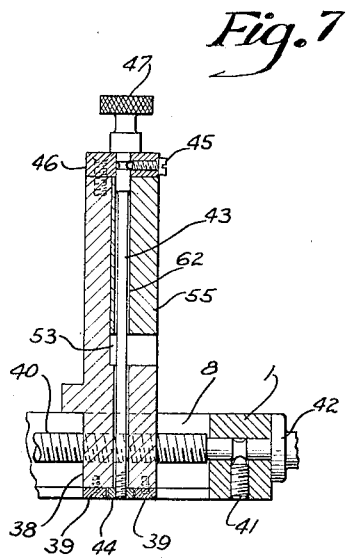
Inventor
Luis J. Garay V.

Feb. 27, 1951 L. J. GARAY V. 2,543,492
CHECKING DEVICE
Filed Jan. 10, 1947 3 Sheets-Sheet 3
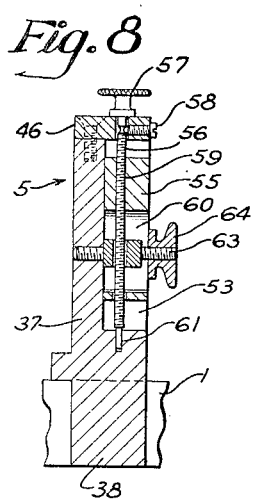
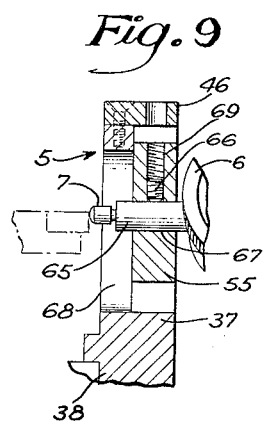
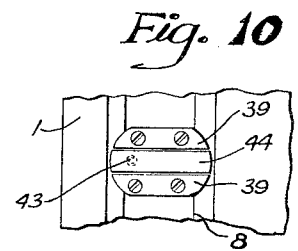
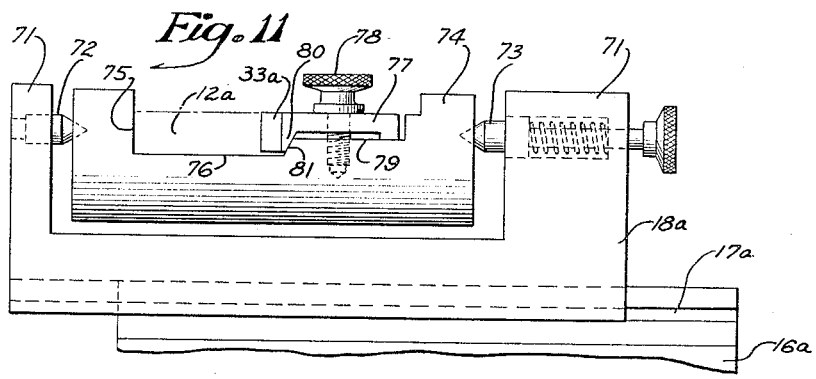
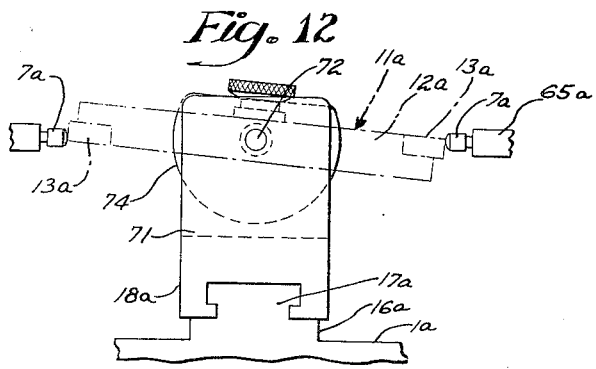
Inventor
Luis J. Garay V Patented Feb. 27, 1951

2,543,492

UNITED STATES PATENT OFFICE 2,543,492

CHECKING DEVICE

Luis J. Garay V., Lima, Peru

Application January 10, 1947, Serial No. 721,365

2 Claims. (Cl. 33—174)

The present invention relates to improvements in instruments for checking the dimensions and concentricity of cutting tools and other machined parts, and has specific reference to a checking device adapted for checking the eccentricity and the location of the cutting edges of single or multiple edged tools with respect to a fixed reference point.

One of the objects of the invention is to provide a checking device of the foregoing character which is adaptable for use with a large variety of cutting tools and which is capable of ready, accurate and convenient manipulation.

Another object is to provide a checking device which is rugged, compact and inexpensive in construction and which is accurate and reliable in use.

Other objects and advantages will become apparent as the description proceeds.

In the accompanying drawings,

Fig. 3 is a right end view of the device.

Fig. 4 is a fragmentary transverse sectional view of the work fixture taken substantially along lines 4—4 of Fig. 2.

Fig. 5 is a fragmentary plan view of the work fixture and illustrating one means for locating a block type boring cutter in centered position.

Fig. 6 is a fragmentary side elevational view of the structure illustrated in Fig. 5.

Figure 1:
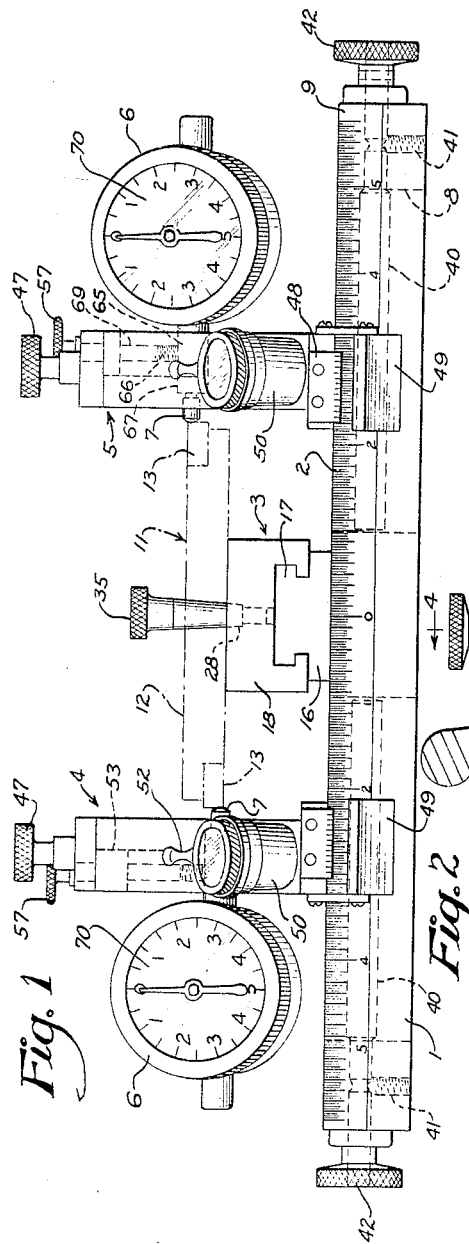
Figure 1 is a front elevational view of a checking device embodying the features of the invention.
Figure 2:
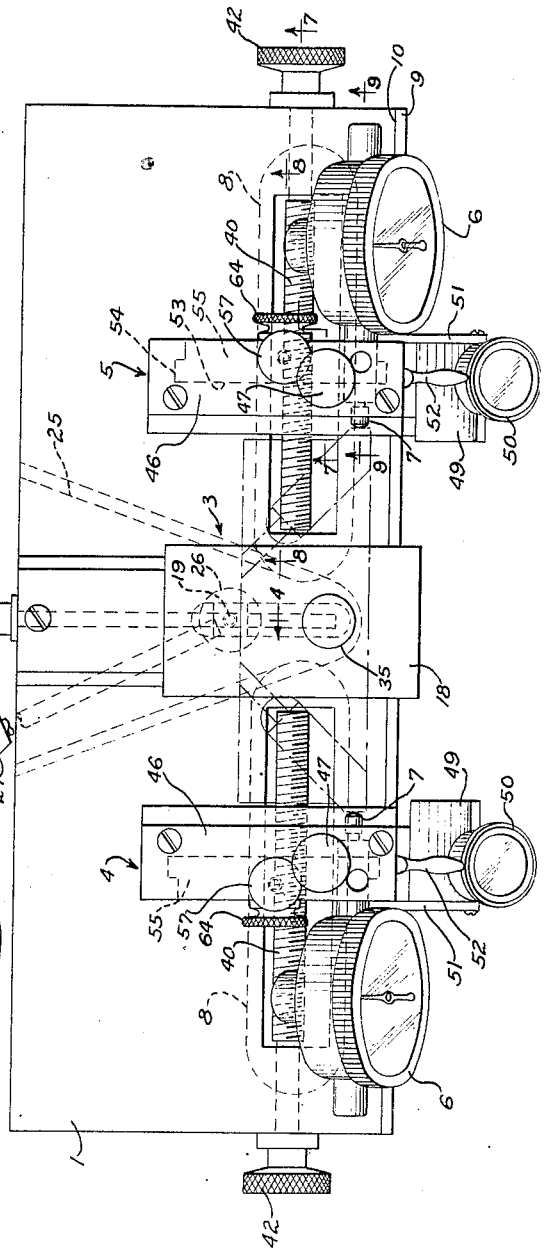
Fig. 2 is a plan view of the device.

Figs. 7, 8 and 9 are fragmentary vertical sectional views of one of the checking fixtures taken respectively along lines 7—7, 8—8 and 9—9 of Fig. 2.

Fig. 10 is a fragmentary bottom view of the means for guiding and clamping the checking fixture.

Fig. 11 is a fragmentary side elevational view of a modified form of work fixture.

Fig. 12 is a fragmentary front elevational view of the fixture shown in Fig. 11.

Referring more particularly to the drawings, the checking device constituting the exemplary embodiment of the invention comprises an elongated base plate 1 adapted to be mounted upon a work bench or other suitable support, and provided along the front edge with a longitudinl scale 2 having a central zero reference point and two like sets of graduations of ascending order extending respectively in opposite directions from the reference point.

A work fixture 3 is mounted on the plate 1 for supporting alternatively a master gauge member or the part to be checked thereagainst, and is provided with means for accurately locating and supporting either the member or the work part in symmetrical or centered relation to the zero reference point of the scale 2. Suitable checking fixtures 4 and 5 are mounted on the plate 1 respectively at opposite sides of the work fixture 3 for independent longitudinal adjustment along the scale 2 into opposed positions predetermined by the dimensions of the master gauge member, and are adapted to support respectively two appropriate measuring elements, such for example as dial indicators 6 with actuating stems or buttons 7 for contacting the work surfaces to be checked. The indicator stems 7 are arranged to extend longitudinally of the scale 1, and are independently axially adjustable within their supporting fixtures 4 and 5, so that they may be located, while in contact with the opposite ends of the master gauge member, and providing the fixtures are correctly positioned in relation to the zero reference point, to set the indicators 6 for zero readings. The work fixture 3 and the indicators 6 are also selectively adjustable in mutually perpendicular directions transversely of the plate 1 in order to secure the desired alignment between the stems 7 and the work surfaces to be contacted.

Considering now the detailed construction of the checking device, the base plate 1 is preferably flat and rectangular in shape, and is formed with two spaced aligned longitudinal guide slots 8 in opposite end portions respectively for supporting the checking fixtures 4 and 5. The scale 2 is formed on a metal strip 9 set and secured as an insert within a longitudinal notch 10 in the upper front edge of the plate 1, and may comprise graduations of any suitable units of measurement, such as inches and sub-divisions thereof.

The work fixture 3 is provided to locate and support the part to be measured or to be checked against a standard, in accurately centered relation to the zero reference point of the scale 2, and hence may be varied in construction depending on the character of the measurements to be made. Although not limited to the measurement of any particular type of work part, the checking device, in general, is especially adapted for checking either a single dimension or several dimensions bearing some definite relation to a fixed central point or axis, and is specifically disclosed in a form adapted for checking the opposed cutting edges of a block type boring tool 11. More particularly, the tool 11, as shown, comprises a flat elongated bar 12 having inserted blade cutters 13 symmetrically clamped in opposite ends, and formed centrally thereof with a locating slot 14. In use, the bar 12 is inserted through a slot in a boring bar (not shown), is located in central position by a key engaging in the slot 14 so that both cutters 13 will have the same circle of revolution, and is clamped in position by a taper screw engaging in a tapered hole 15. To support the tool 11 rigidly in centered position between the checking fixtures 4 and 5, and in reference to the zero point of the scale 2, the work fixture 3 preferably comprises an upstanding base or pedestal 16 rigid with the top of the base plate 1 and formed with horizontal transverse guides 17. A tool or work supporting slide 18 is confined on the pedestal 16 in sliding engagement with the guides 17 for adjustment transversely of the base plate 1.

Any suitable means may be provided for adjusting the slide 18 and securing it in selected position of adjustment. In the present instance, a nut 19 is secured to the underside of the slide 18 and extends downwardly through a transverse slot 20 in the pedestal 16. An adjusting screw 21 journalled in the rear portion of the pedestal 16 extends longitudinally into the slot 20, and is in threaded engagement with the nut 19. The screw 21 is constrained against endwise movement by a peripheral spline 22, and is provided at its outer end with an adjusting knob 23. An axial threaded stud 24 on the lower end of the nut 19 extends into a transverse V-shaped slot 25 in the base plate 1, and is engaged by a clamp nut 26 having a rearwardly projecting operating handle 27. Swinging movement of the handle 27 within the slot or clearance 25 will either release the nut 26 to permit adjustment of the slide 18, or will tighten the nut against the lower surface of the pedestal 16 to secure the slide in position of adjustment.

The slide 18 is provided with means for locating and clamping the tool 11 in the same central or symmetrical position with reference to the zero point of the scale 2 that the tool would occupy when mounted in the boring bar. Thus, the top of the slide 18 is flat, and formed in the top with a tapered opening 28 adapted for registration with the opening 15 in the tool 11. The tool 11 may be quickly and accurately positioned on the slide 18 by means of a locating block or bar 29 aligned by a key 30 and centered by dowel pins 31. The bar 29 has a straight edge 32 parallel to the guide slots 8, and a key 33 is inserted in this edge for engaging in the slot 14 in the tool 11. The dowels 31 and the key 33 are so located that the latter will be located accurately on center with the zero reference point of the scale 2. Consequently, when the tool 11 is located against the edge 32, with the key 33 inserted in the slot 14, it also will be accurately centered. To secure the tool 11 against the edge 32, a tapered screw 34, with a hand knob 35, is inserted through the hole 15 into the hole 28, and threaded into a tapped hole 36 at the bottom of the latter. The screw 34 bears hard against the side of the hole 15 adjacent the edge 32 to insure tight contact of the tool bar 12 against the bar 29. It will be understood that different types and sizes of locating bars may be substituted as required to suit different kinds of cutter bars. In some instances, it may be expedient to dispense with the locating bar 29, and rely solely on the tapered screw 34 to centralize the tool bar.

The checking fixtures 4 and 5 preferably are alike in construction, and hence a description of one will suffice for both, like parts of the two being identified by the same reference characters. Thus, each fixture comprises an upright frame or bracket 37 movable on the base plate 1, and having a depending square-sided lug 38 slidably guided in the associated slot 8. Two spaced parallel cross plates 39 are attached to the bottom of the lug 38, and overlap the countersunk side edges of the slot 8 to confine the frame 37 adjustably in position. An adjusting screw 40, journalled in the outer end of the base plate 1, extends longitudinally in the slot 8 and through threaded engagement with the lug 38. The screw 40 is constrained against endwise movement by a peripheral spline 41, and is provided at the outer end with a hand knob 42. To provide means for clamping the frame 37 in selected position of adjustment, a draw bolt 43 is rotatably anchored therein at the upper end, and is threaded at the lower end into a clamp plate 44 disposed between the gib plates 39. In the preferred construction, the upper end of the bolt 43 is rotatably confined by a peripheral spline 45 in a cross plate 46 bridging the top of the frame 37, and is provided with a hand knob 47 to facilitate rotation.

The adjustment of each of the fixtures 4 and 5 is indicated by the scale 2, and is normally set to correspond to the desired dimension of the tool 11 from the zero reference point to the contiguous outer end surface to be checked. To insure accuracy of location, a vernier 48 is attached to the front of each fixture frame 37 in cooperative relation to the scale 2, and the readings are reflected by an adjustable mirror 49 to an optical unit 50 for observation by the user of the checking device. The mirror 49 and unit 50 are suitably supported by arms 51 and 52 from the associated fixture frame 37 for adjustment therewith.

The frame 37 of each checking fixture is formed in the outer face with a flat recess 53 defining spaced parallel vertical guideways 54 closed at the top by the cross plate 46. Slidably disposed within the recess 53, and confined within the guideways 54, for vertical adjustment is a block or slide 55 supporting the dial indicator 6. A vertical adjusting screw 56, with a hand knob 57 on the upper end, is rotatably confined in the cross plate 46 by a spline 58, and extends downwardly through and in threaded engagement with a tapped hole 59 in the block 55, and then through an elongated vertical guide slot 60 in the latter. The extreme lower end of the screw 56 is reduced in diameter and journalled in a bore 61 in the base of the recess 53. It will be understood that the drawbolt 43 for clamping the frame 37 extends freely through a vertical bore 62 in the block 55. To provide means for clamping the block 55 in selected position of adjustment, a double-end screw stud 63 is anchored to the frame 37 and extends into the slot 60. The stud 63 is apertured transversely to receive the adjusting screw 56. A knurled nut 64 is threaded on the outer end of the stud 63, and adapted to be tightened thereon against the block 55 to clamp the latter in position.

The dial indicator 6 is provided with a radial supporting sleeve 65 through which the actuating stem 7 extends, and which is adjustably secured by a set screw 66 in a bore 67 opening through the block 55 in a direction parallel to the scale 2. A vertical slot 68 opens from the inner face of the recess 53 through the frame 37 to receive the sleeve 65 and stem 7 and permit engagement of the latter with the adjacent end of the tool 11 or other work part. The set screw 66 is accessible through a vertical tapped bore 69 from the top of the block 55. The dial indicator 6 per se forms no part of the present invention, and hence is not disclosed in detail. It is sufficient to state that the indicator has a scale 70, with a zero point between positive and negative graduations representing the same units of measurements as the scale 2, and that the stem 7 is normally spring-urged outwardly toward the work fixture 3.

In operation, the indicator setting is checked to insure that the position of the stem for zero reading will correspond with the zero point of the vernier 48. This may conveniently be accomplished by the use of a master gauge member which is mounted on the work slide 18 in place of the tool 11, and which has predetermined longitudinal dimensions subject to measurement from opposite sides of the zero reference point of the scale 2. Thus, assuming that the gauge member is four inches long, with a center slot or keyway engageable by the key 33, each of the checking fixtures 4 and 5 is adjusted along the scale 2 until the vernier 48 indicates an accurate setting of two inches at each side. Each indicator 6, with its stem 7 in contact with the gauging surface of the gauge member, is now adjusted, if necessary, to register zero reading.

With the parts thus adjusted and clamped in position, the master gauge member is removed, and the boring cutter to be tested is mounted on the work fixture 3. The fixture slide 18 and the blocks 55 are of course adjusted as required to locate the stems or buttons 7 in proper alignment with the gauging surfaces of the blade cutters 13. Therefore, the indicators 6 will afford an accurate check of the radial dimension of each cutting edge with reference to the center keyway 14 and also of the concentricity of the edges; plus and minus deviations being indicated by positive and negative readings. The foregoing represents use of the checking devices as a comparator, without resetting, for tools of the same dimensions within a normal range of tolerances. It will be understood, however, that the device may also be employed to take direct measurements merely by adjusting either or both of the checking fixtures 4 and 5 to the dimensions of any given work part. Assuming that the indicators 6 remain properly correlated with the verniers 48, each measurement may be taken directly from the scale 2 if the related indicator registers zero, or computed from the sum of the readings if the indicator does not register zero.

The stationary type of work fixture 3, although suitable for determining concentricity and radial spacing of certain tool surfaces in one setting, does not permit of direct measurement of the actual cutting diameter of the edges of the tool 11ª, and is not adapted for the testing of cutting edges which are not substantially diametrically opposed. Figs. 11 and 12 illustrate a modified form of work fixture of the swivel type which is adapted for the measurement of cutting diameter and of acutely spaced radial dimensions. In this fixture, a slide 18ª, corresponding to the slide 18, is provided with upstanding end brackets 71 respectively supporting a fixed center 72 and an axially-aligned retractible center 73. An arbor 74 is adapted to be supported endwise between the centers 72 and 73, and is cut away on one side to provide a side abutment 75 and a flat mounting surface 76 for the tool 11. The surface 76 is of such depth that the transverse center line of the tool bar 12ª will be coincident with the axis of rotation of the arbor 74. A clamping plate 77 is removably secured by a knurl-headed screw 78 to another flat surface 79 in stepped relation to the surface 76, and is formed with a locating key 33ª for engaging in the slot 14, and with a wedge flange 80 arranged for engagement with an inclined face 81 to clamp the tool bar 12 securely against the abutment 75. It will be evident that by rotary adjustment of the arbor 74, the diametrically opposed edges of the cutters 13ª may be brought simultaneously and directly into gauging contact with the dial indicators 6 to check not only the concentricity but also the actual cutting diameter of the edges.

I claim as my invention:

1. A checking device for measuring external surfaces in relation to a zero reference point comprising, in combination, an elongated base plate formed with a longitudinally extending slot and a fixed transverse guide, a linear scale on the front longitudinal edge of said plate and having a zero reference point located centrally of said guide, a slide mounted for adjustment on said guide and adapted to support the part to be checked, means for locating and clamping said part on said slide in predetermined relation to said reference point, an upright frame slidably guided in said slot for adjustment along said scale member, said frame being formed with a vertical guideway, a block mounted for adjustment in said guideway, and a dial indicator supported on said block and having an actuating stem engageable with said part, said indicator being bodily adjustable on said block longitudinally of said scale member to permit of correlation therewith, said indicator having a scale for indicating positive and negative deviations in the spacing from said zero reference point of the surface of said part being checked from a predetermined setting of the frame.

2. A checking device for measuring external surfaces in relation to a zero reference point comprising, in combination, an elongated base plate formed with a longitudinally extending slot and a fixed transverse guide, a scale member secured to the front longitudinal edge of said plate and having a zero reference point located centrally of said guide, a slide mounted for adjustment on said guide and adapted to support the part to be checked, means for adjusting said slide, means for clamping said slide in adjusted position, means for locating and clamping said part on said slide in predetermined relation to said reference point, an upright frame slidably guided in said slot for adjustment along said scale member, means for adjusting said frame, means for clamping said frame in adjusted positions, said frame being formed with a vertical guideway, a block mounted for adjustment respectively in said guideway, means for adjusting said block, means for clamping said block in position, and a dial indicator supported on said block and having an actuating stem engageable with said part, said indicator being adjustable on said block longitudinally of said scale member to permit of correlation therewith, said indicator having a scale for indicating positive and negative deviations in the spacing from said zero reference point of the surface of said part being checked from a predetermined setting of the associated frame.

LUIS J. GARAY V.

REFERENCES CITED

The following references are of record in the file of this patent:

UNITED STATES PATENTS

| Number | Name | Date |
|---|---|---|
| 1,474,992 | Zuber | Nov. 20, 1923 |
| 1,554,646 | Olson | Sept 22, 1925 |
| 1,579,108 | Harter | Mar. 30, 1926 |
| 2,136,134 | Holley | Nov. 8, 1938 |
| 2,359,018 | Balk | Sept. 26, 1944 |
| 2,421,958 | McComb | June 10, 1947 |
| 2,495,891 | Davis | Jan. 31, 1950 |

FOREIGN PATENTS

| Number | Country | Date |
|---|---|---|
| 418,780 | England | Oct. 31, 1934 |